3,385,902
PRODUCTION OF TRIMETHYLPHENOLS
David Bruce Bright, Oakland, Walter V. Turner, Jr., Berkeley, and Ellis R. White, Oakland, Calif., assignors to Shell Oil Company, New York, N.Y., a corporation of Delaware
No Drawing. Filed Nov. 25, 1966, Ser. No. 596,767
6 Claims. (Cl. 260—621)

ABSTRACT OF THE DISCLOSURE

Trimethylphenols, particularly 3,4,5- and 2,3,5-trimethylphenol, are prepared by (1) low-temperature chlorination of 3,5,5-trimethyl-3-cyclohexen-1-one to produce 4-chloroisophorone and (2) heating 4-chloroisophorone with an aqueous mineral acid solution. The phenols are especially useful as germicidal materials and for conversion into soil insecticidal materials.

---

This invention relates to an improved process for the production of trimethylphenols, and more particularly to the production of 3,4,5- and 2,3,5-trimethylphenol.

Prior art

A. J. B. Edgar, S. H. Harper, and M. A. Kazi, J. Chem. Soc., 1957, 1083, have treated isophorone with N-bromosuccinimide to obtain 4-bromoisophorone in 50% yield. They further found that alkaline hydrolysis (aqueous sodium carbonate) of 4-bromoisophorone produced 3,4,5-trimethylphenol admixed with a 39% yield of 4-hydroxyisophorone. An economical and commercially feasible route to trimethylphenols, particularly 3,4,5- and 2,3,5-trimethylphenol, which are useful germicidal materials, would advance the art.

The invention

It has now been found that a commercially feasible process for the production of high yields of 3,4,5-trimethylphenol in major amount in admixture with 2,3,5-trimethylphenol in minor amount consists essentially of (1) chlorinating 3,5,5-trimethyl-3-cyclohexen-1-one at low temperature in an alkaline medium to produce 4-chloroisophorone and (2) treating 4-chloroisophorone with an aqueous solution of mineral acid, preferably hydrochloric acid, of normality of from about 1 to about 15 at a temperature in the range of about 50 to about 125° C.

Reactants 3,5,5-trimethyl-3-cyclohexen-1-one, the desired starting material in the process of the invention, can be obtained by isomerizing isophorone. 3,5,5-trimethyl-3-cyclohexen-1-one, α,β,γ-unsaturated isomer, is the more volatile isomer of isophorone, the former boiling at 108° C. at 70 mm. Hg and the latter boiling at about 128° C. at the same pressure. When a catalytic amount of a high-boiling acid, e.g. p-toluenesulfonic acid, is added to isophorone, an approximately 1:1 mixture of 3,5,5-trimethyl-3-cyclohexen-1-one and isophorone can be continuously distilled therefrom, e.g. distillation at 116–125° C. at 70 mm. Hg. Pure 3,5,5-trimethyl-3-cyclohexen-1-one is obtained by refractionation, for example through a 40-plate column, of the above 1:1 mixture of isomers. Other catalysts for the isomerization of α,β-unsaturated ketones to β,γ-unsaturated ketones, such as those described by F. A. Bent, U.S. Patent 2,197,462, Apr. 16, 1940, may be used.

In the conversion of 3,5,5-trimethyl-3-cyclohexen-1-one to produce the novel 4-chloroisophorone, the chlorination step is conducted carefully at low temperatures, below −5° C., and in an alkaline medium. 3,5,5-trimethyl-3-cyclohexen-1-one is rapidly isomerized back to isophorone even at −5° C. in the presence of traces of acid; the prevention thereof is effected by neutralization of the hydrogen chloride formed during the chlorination by means of the alkaline medium.

In the process of the invention, the novel reactant 4-chloroisophorone is treated with aqueous mineral acid solution. By mineral acids is meant strong inorganic acids, i.e. hydrochloric, hydrobromic, sulfuric, phosphoric, and nitric. The mineral acid most preferred for use in this process is hydrochloric acid. Nitric acid, though usable, is the least preferred since it may effect some substitution of the phenolic ring and/or will undergo some decomposition upon contact with hydrochloric acid, which is formed in situ regardless of the mineral acid started with.

Reaction conditions

Chlorination of 3,5,5-trimethyl-3-cyclohexen-1-one is carried out in liquid media inert to the reagents and possessing melting points below −20° C. Halogenated hydrocarbons are a convenient group of such solvents; a preferred liquid medium is carbon tetrachloride. To provide the required alkaline conditions in the medium, an alkaline material is added thereto. A convenient manner in which to accomplish this comprises the addition to the liquid medium of solid sodium bicarbonate, for example, in one mole excess, to neutralize the hydrogen chloride as it is formed, thereby preventing isomerization of 3,5,5-trimethyl-3-cyclohexen-1-one back to isophorone during the chlorination. The chlorination is conducted at temperatures from about −20 to about +5° C. and preferably from about 0 to about +5° C. The product of the chlorination is the novel compound 4-chloroisophorone, which is produced in yields of 63 to 90%. 4-chloroisophorone is a white solid, M.P. 40–42° C. Pure 4-chloroisophorone may be obtained by repeated crystallizations from hexane.

The production of improved yields of 3,4,5-trimethylphenol in admixture with 2,3,5-trimethylphenol is accomplished by treating 4-chloroisophorone with aqueous mineral acid at a temperature in the range of about 50 to about 125° C. and preferably in the range of about 100 to about 110° C. The process is preferably carried out in a closed vessel and is thereby operated at autogenous, i.e. elevated, pressure. However, an open vessel may be used at refluxing temperatures, or below, of aqueous acid, thereby operating at atmospheric pressure. Lower temperatures may be used but required an increase in reaction time. Higher temperatures than 125° C. may be used but are not necessary due to the speed of the reaction; however, much higher temperatures, e.g. above 175° C., are to be avoided because of the ease with which the desired phenolic products are heat-degraded, resulting in loss of yield. It is possible to heat 4-chloroisophorone at temperatures above 175° C. in the absence of aqueous mineral acid to obtain some trimethylphenol; however, the yields of desired product are low and are accompanied by formation of a quantity of tar.

The concentration of the aqueous mineral acid required for the conversion of 4-chloroisophorone to trimethylphenol is in the range of from about 1 N to about 15 N, and preferably from about 3 N to about 12 N. Since normality depends upon relative volumes of the reagents, these may be adjusted to keep normality within these ranges, particularly when operating continuously as described hereinbelow. When operating batchwise, it is convenient to initiate the process at a normality in the lower range, for example from 3 N to 6 N, and permit the in situ formed acid to be retained, thereby increasing the acidity of the reaction mixture.

Upon treatment with the above-described hot (50–125° C.) aqueous acid, 4-chloroisophorone extremely rapidly loses a mole of HCl and rearranges to give mixtures in the ratio of about 85–95% by mole of 3,4,5-trimethylphenol to about 15–5% by mole of 2,3,5-trimethylphenol. In the process of the invention, particularly when utilizing hydrochloric acid, yields of the mixture of these two phenols in the vicinity of 90%, based on 4-chloroisophorone consumed, are obtained.

In one modification of the process, the 4-chloroisophorone obtained from the low temperature, alkaline medium chlorination of 3,5,5-trimethyl-3-cyclohexen-1-one is purified by repeated crystallization and then treated with aqueous acid at the required temperature to produce trimethylphenol products in the highest yields. A more preferred modification resulting in a more practical and economical process with only a small loss of yield comprises not purifying the 4-chloroisophorone but treating the mixture of chlorinated products, i.e. crude chlorinated 3,5,5-trimethyl-3-cyclohexen-1-one containing a major portion of 4-chloroisophorone, with the required acid and heat to produce the desired phenolic products.

The process also may be operated in a continuous manner. In one modification of the process a lightly heated stream (about 45° C.) of 4-chloroisophorone, taken from a chlorinator wherein 3,5,5-trimethyl-3-cyclohexen-1-one is continuously chlorinated as described hereinabove, and an aqueous acid stream, which is ultimately a recirculating acid stream, are pumped to the top of a rotating disc contactor (see G. T. Reman, U.S. 2,601,674, June 24, 1952) made of corrosion-resistant material or to a glass-lined steel tower packed with ceramic rings. A single stream is removed from the bottom and led to a phase separator wherein the organic phase containing the desired phenolic product separates from the aqueous acid phase. The aqueous acid is removed and pumped for recirculation to the initial reactor via a heat exchanger unit. Since acid is a by-product of the process, bleeding of this line to reduce and/or maintain desired acid strength followed by any necessary addition of water is provided. It may be desirable to operate at moderate acid concentrations to reduce corrosion problems inherent in the use of very strongly acidic media. The organic phase removed from the phase separator is washed with water and then distilled, e.g. by flashing, to remove small amounts of tar impurity to yield the desired mixture of 3,4,5- and 2,3,5-trimethylphenol. Alternatively, in place of the tower arrangement, multistage glass-lined vessels equipped with corrosion-resistant stirring means may be employed for continuous operation, the first vessel of the series being fed by the warmed 4-chloroisophorone stream and acid stream and the last vessel of the series leading to the phase separator.

Utility

J. G. Kuderna, Jr., and D. D. Phillips, U.S. Patent 3,130,122, Apr. 21, 1964, disclose the preparation of 3,4,5-trimethylphenyl methylcarbamate by reacting 3,4,5-trimethylphenol with methyl isocyanate in the presence of a catalytic amount of a catalyst such as a tertiary aliphatic amine; the patent indicates that this carbamate is an effective insecticide for controlling soil-dwelling insect pests. The present invention provides the 3,4,5-trimethylphenol precursor for the abovementioned carbamate. It has been found that a surprisingly effective insecticide for controlling soil-dwelling insects is the mixture of 3,4,5-trimethylphenyl methylcarbamate and 2,3,5-trimethylphenyl methylcarbamate, prepared by reacting the 3,4,5-trimethylphenol in admixture with 2,3,5-trimethylphenol, provided directly by the process of the present invention, with methyl isocyanate at about 40–45° C. in an inert solvent and in the presence of a catalytic amount of triethylamine.

Example 1

A 3-necked, 500-ml, round-bottom flask was equipped with an air-driven stirrer, a thermometer, and a sintered-glass gas inlet tube. To the flask were charged 20.0 grams (0.145 mole) of 3,5,5-trimethyl-3-cyclohexen-1-one, 25.4 grams (0.302 mole) of sodium bicarbonate, and 200 ml. of carbon tetrachloride. Over a one-hour period 13 grams (0.183 mole) of chlorine was added, while the flask was cooled at −12 to −16° C. When addition was completed, the flask was allowed to warm up.

The mixture was washed three times with an equal volume of water, then stripped of carbon tetrachloride at 30–35° C. under reduced pressure. There remained 26.1 g. of light yellow viscous liquid, which on chilling partially crystallized. The whole product was dissolved in 26 ml. of n-hexane and placed in a refrigerator for crystallization to take place. Filtration gave 12.7 g., M.P. 35–38° C. A second crop was obtained by adding isopentane to the liquor: 3.1 g.; M.P. about 25° C. Gas-liquid chromatographic (GLC) analysis of the liquor indicated the presence of an additional 3 grams of 4-chloroisophorone. Total yield was 75%. Yield of crystalline 4-chloroisophorone was 63%. An analytical sample was obtained by recrystallizing the first crop three times from isopentane and twice from hexane: M.P. 40–42° C.

An ultraviolet spectrum of the analytical sample showed absorption at $\lambda_{max}=2230$ $\mu$, $\epsilon_{max}=13,750$ and a broad absorption at 3300–3500 $\mu$, $\epsilon_{max}=25.2$. The carbonyl absorption in infrared is 6.02 $\mu$. A nuclear magnetic resonance spectrum in carbon tetrachloride showed two singlets for gem-dimethyl at $\delta=1.13$ and $\delta=1.22$; a doublet for the third methyl at $\delta=2.11$ with $J=1.3$ cps.; two doublets for —$CH_2$— at $\delta=2.06$ and $\delta=2.58$ with $J=16$ cps.; a singlet for C–H in the 4-position at $\delta=4.30$; the vinyl hydrogen is slightly split at $\delta=5.82$.

*Analysis.*—Calculated for $C_9H_{13}OCl$: C, 62.8; H, 7.6; Cl, 20.6. Found: C, 62.7; H, 7.8; Cl, 20.3.

Example 2

In a 15-ml., round-bottom flask equipped with a magnetic stirring bar and a reflux condenser were placed 1.08 g. (0.00628 mole) of 4-chloroisophorone and 5.6 ml. (0.0336 mole) of 6 N HCl. The mixture was then stirred at 108° C. (reflux) for 16 minutes. The organic phase was extracted into ether, which then was dried over magnesium sulfate. Evaporation of the ether gave 0.70 g. of white solid melting at 87–100° C. and another 0.06 g. was recovered by ether extraction of the magnesium sulfate used for drying, the sum resulting in a total of 90% of the theoretical yield of trimethylphenol. By gas-liquid chromatographic (GLC) analysis this was identified as 91% of 3,4,5-trimethylphenol and 9% of 2,3,5-trimethylphenol. No 4-chloroisophorone remained.

Example 3

Following the method described in Example 2 while varying the starting materials produced the results summarized in Table 1 below.

TABLE 1.—CONVERSION OF 4-CHLOROISOPHORONE TO TRIMETHYLPHENOLS

| | Starting Material | |
|---|---|---|
| | Crude 4-chloro-isophorone [1] (5.3 g.) | Crude 4-chloro-isophorone [1] (15.4 g.) |
| Reagent | 20 ml., 6 N HCl | 25 ml., 6 N HCl |
| Time, min | 10 | 10 |
| Temperature, ° C | 108 | 108 |
| Conversion, Percent | 100 | 99 |
| Yield of Phenols, Percent | [2][3] 93 | [2][4] 77 |
| Relative Amount of Trimethylphenols, Percent: | | |
| 3,4,5-trimethylphenol | [3] 82 | 88 |
| 2,3,5-trimethylphenol | [3] 18 | 12 |

[1] Chlorination product of 3,5,5-trimethyl-3-cyclohexen-1-one.
[2] Based on 3,5,5-trimethyl-3-cyclohexen-1-one consumed.
[3] Assuming no tars in residue from crystallization.
[4] Correcting for tars estimated by GLC.

We claim as our invention:
1. The process for producing 3,4,5-trimethylphenol in substantially major amount in admixture with 2,3,5-trimethylphenol in minor amount by heating at a temperature in the range of about 50 to about 125° C., 4-chloroisophorone in the presence of an aqueous solution of mineral acid of normality of from about 1 to 15.

2. The process in accordance with claim 1 wherein the acid strength is from about 3 N to about 12 N.

3. The process in accordance with claim 1 wherein the temperature is in the range of about 100 to about 110° C.

4. The process in accordance with claim 1 wherein the mineral acid is hydrochloric acid.

5. The process in accordance with claim 1 wherein the mixture of trimethylphenols produced consists essentially of about 85–95% by mole of 3,4,5-trimethylphenol and about 15–5% by mole of 2,3,5-trimethylphenol.

6. The process in accordance with claim 1 wherein the 4-chloroisophorone is produced by treating 3,5,5-trimethyl-3-cyclohexen-1-one with chlorine at a temperature between from about −20 to about +5° C. in an inert liquid medium in the presence of an alkaline material.

No references cited.

BERNARD HELFIN, *Acting Primary Examiner.*

H. ROBERTS, *Assistant Examiner.*